US009483892B2

(12) United States Patent
Lee et al.

(10) Patent No.: US 9,483,892 B2
(45) Date of Patent: Nov. 1, 2016

(54) SMART KEY APPARATUS AND METHOD FOR PROCESSING SIGNAL OF SMART KEY APPARATUS

(71) Applicants: Hyundai Motor Company, Seoul (KR); Kia Motors Corporation, Seoul (KR); Denso PS Electronics Corp., Changwon, Gyeongsangnam-Do (KR)

(72) Inventors: Jae Jun Lee, Gyeonggi-Do (KR); Gweon Yang, Gyeongsangnam-Do (KR)

(73) Assignees: Hyundai Motor Company, Seoul (KR); Kia Motors Corporation, Seoul (KR); Denso Korea Electronics Corporation, Ghangwon, Gyeongsangnam-do (KR)

( * ) Notice: Subject to any disclaimer, the term of this patent is extended or adjusted under 35 U.S.C. 154(b) by 367 days.

(21) Appl. No.: 14/051,185

(22) Filed: Oct. 10, 2013

(65) Prior Publication Data

US 2014/0368314 A1 Dec. 18, 2014

(30) Foreign Application Priority Data

Jun. 14, 2013 (KR) ........................ 10-2013-0068509

(51) Int. Cl.
*G05B 19/00* (2006.01)
*G07C 9/00* (2006.01)

(52) U.S. Cl.
CPC ....... *G07C 9/00944* (2013.01); *G07C 9/00309* (2013.01); *G07C 2009/00341* (2013.01)

(58) Field of Classification Search
CPC .......... B60C 23/0479; B60C 23/0471; B60C 23/0416; B60C 23/0433; B60C 23/0462; H04W 88/08; H04W 16/28; H04W 72/046; H04W 88/06
USPC ............. 340/5.61, 5.7–5.72, 426.28–426.36, 340/442–445, 447; 455/13.3, 25, 63.4, 101, 455/562.1, 575.7; 73/146, 146.5
See application file for complete search history.

(56) References Cited

U.S. PATENT DOCUMENTS

| | | | | |
|---|---|---|---|---|
| 8,243,778 B1 | | 8/2012 | Feng et al. | |
| 2006/0125601 A1* | | 6/2006 | Onishi ................ | H04B 7/0805 340/5.72 |
| 2006/0226952 A1* | | 10/2006 | Baumgartner ...... | B60R 25/2072 340/5.61 |
| 2009/0073062 A1* | | 3/2009 | Tang ................... | H04B 7/0608 343/703 |

FOREIGN PATENT DOCUMENTS

| | | |
|---|---|---|
| JP | 2010-180670 A | 8/2010 |
| JP | 2011-223499 A | 11/2011 |
| JP | 2013-014935 A | 1/2013 |
| KR | 10-0636750 | 10/2006 |
| KR | 10-20120059972 | 6/2012 |

* cited by examiner

*Primary Examiner* — Kerri McNally
*Assistant Examiner* — Sharmin Akhter
(74) *Attorney, Agent, or Firm* — Mintz Levin Cohn Ferris Glovsky and Popeo, P.C.; Peter F. Corless

(57) ABSTRACT

A smart key apparatus and a method of processing a signal from the smart key apparatus is provided and the smart key apparatus includes a plurality of antennas that receive a Low Frequency (LF) signal from a vehicle via a plurality of reception axes. In addition, an LF reception controller receives the LF signal via a reception antenna which is determined by sequentially verifying a reception level according to a set order of the plurality of antennas when receiving the LF signal and determines an antenna having a highest reception level as a reception antenna by comparing a reception level that corresponds to a plurality of antennas respectively. A signal processing unit processes the LF signal received via the reception antenna.

8 Claims, 6 Drawing Sheets

SMART KEY APPARATUS AND METHOD FOR PROCESSING SIGNAL OF SMART KEY APPARATUS

CROSS-REFERENCE TO RELATED APPLICATION

This application is based on and claims priority from Korean Patent Application No. 10-2013-0068509, filed on Jun. 14, 2013 in the Korean Intellectual Property Office, the disclosure of which is incorporated herein in its entirety by reference.

BACKGROUND

1. Field of the Invention

The present invention relates to a smart key apparatus and a method for processing a signal thereof, and more particularly, to an apparatus and a method for processing a signal when a communication error occurs during the communication between a vehicle and a smart key.

2. Description of the Related Art

In general, a smart key system receives a low frequency (LF) signal which is received from a vehicle by a smart key via an LF antenna, determines a communication code, and transmits a radio frequency (RF) signal to the vehicle based on the determination result. A method of determining the communication code for a three-axis reception antenna includes determining an antenna which received a radio signal that has a receive sensitivity greater than a threshold value according to a priority of each axis, and receiving a signal via a corresponding antenna.

However, in this case, since the reception antenna is determined based on the priority, even though an antenna having a low priority receives a radio signal having a higher receive sensitivity, an antenna having a higher priority may be determined as a reception antenna despite the low reception level. When the receiving sensitivity of the reception antenna is approximately a threshold value level, a communication error may occur during the communication.

SUMMARY

The present invention provides a smart key apparatus and a method for processing a signal thereof which rapidly processes a communication error by receiving a signal via an antenna which has a highest reception level among antennas of each axis disposed within a smart key when the communication error occurs during the communication between a vehicle and the smart key.

The present invention further provides a smart key apparatus and a method for processing a signal thereof which increase a reception efficiency of a reception antenna by changing the reception level of the other antennas except for the antenna having the highest reception level among the antennas of each axis disposed within the smart key into the lowest reception level.

The present invention further provides a smart key apparatus and a method for processing a signal thereof which processes a communication error of a smart key by changing a logic of the method.

In accordance with an aspect of the present invention, a smart key apparatus may include: a plurality of antennas that receive a Low Frequency (LF) signal from a vehicle via a plurality of reception axes; an LF reception controller that receives the LF signal via a reception antenna which is determined by sequentially verifying a reception level according to a set order of the plurality of antennas when receiving the LF signal, and determines an antenna having a highest reception level as a reception antenna by comparing a reception level that corresponds to a plurality of antennas respectively; and a signal processing unit that processes the LF signal received via the reception antenna. The LF reception controller may be configured to determine an antenna of a first order which has a reception level that is a reference value or more among the plurality of antennas as a reception antenna when a communication error with the vehicle does not occur. The LF reception controller may be configured to execute a reception level that corresponds to the plurality of antennas. In addition, the LF reception controller may be configured to change the reception level of the remaining antennas except for the reception antennas when a communication error with the vehicle occurs. The LF reception controller may be configured to change a reception level of the remaining antennas to a lowest level. Further, the LF reception controller may be configured to determine that the vehicle does not exist (e.g., the vehicle is not located) within a communication area when a reception level of a reception antenna which is determined when communication error occurs with the vehicle is less than a reference value. The plurality of antennas may include: a first LF antenna that receives an LF signal from an x-axis; a second LF antenna that receives an LF signal from a y-axis; and a third LF antenna that receives an LF signal from a z-axis.

In accordance with another aspect of the present invention, a method for processing a signal of a smart key apparatus may include: determining, by a controller, a first reception antenna by sequentially verifying a reception level according to a set order of a plurality of antennas when receiving a LF signal from the plurality of antennas which receive a Low Frequency (LF) signal from a vehicle via a plurality of reception axes; processing, by the controller, an LF signal which is received via the first reception antenna; comparing, by the controller, a reception level that corresponds to each of the plurality of antennas when a communication error with the vehicle occurs; determining, by the controller, an antenna having a highest reception level among the plurality of antennas as a second reception antenna based on the comparison; and processing, by the controller, an LF signal which is received via the second reception antenna.

BRIEF DESCRIPTION OF THE DRAWINGS

The objects, features and advantages of the present invention will be more apparent from the following detailed description in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figure 1:
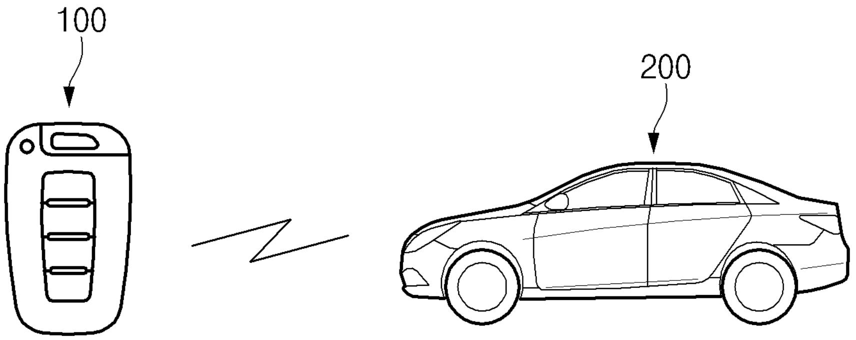
FIG. 1 is an exemplary diagram illustrating a system configuration to which a smart key apparatus is applied according to an exemplary embodiment of the present invention.

FIG. 1 is an exemplary diagram illustrating a system configuration to which a smart key apparatus is applied according to an exemplary embodiment of the present invention. Referring to FIG. 1, the smart key apparatus 100, executed by a controller, according to the present invention may be configured to process a signal via a communication with a vehicle 200. In particular, when a Low Frequency (LF) signal is transmitted from a LF antenna of a smart key unit disposed within the vehicle 200, the LF antenna of a smart key apparatus 100 may be configured to receive the LF signal. Specifically, the LF antenna of the smart key apparatus 100 may be configured to receive the LF signal via a plurality of reception axes, and in an exemplary embodiment of the present invention, the LF signal may be received via the LF antenna of three axes (x-axis, y-axis, z-axis) as an example, however, it is not limited thereto.

Moreover, the smart key apparatus 100 may be configured to process the received LF signal, and transmit the response signal that corresponds to the signal thereof to the smart key unit of the vehicle 200. In particular, the smart key apparatus 100 may be configured to transmit the response signal as an radio frequency (RF) scheme. The smart key unit may be configured to transmit a wake-up signal to the smart key apparatus 100 for a smooth communication with the smart key apparatus 100, and the reception antenna of the smart key apparatus 100 may be determined when the smart key apparatus 100 responds to the wake-up signal.

Figure 2:
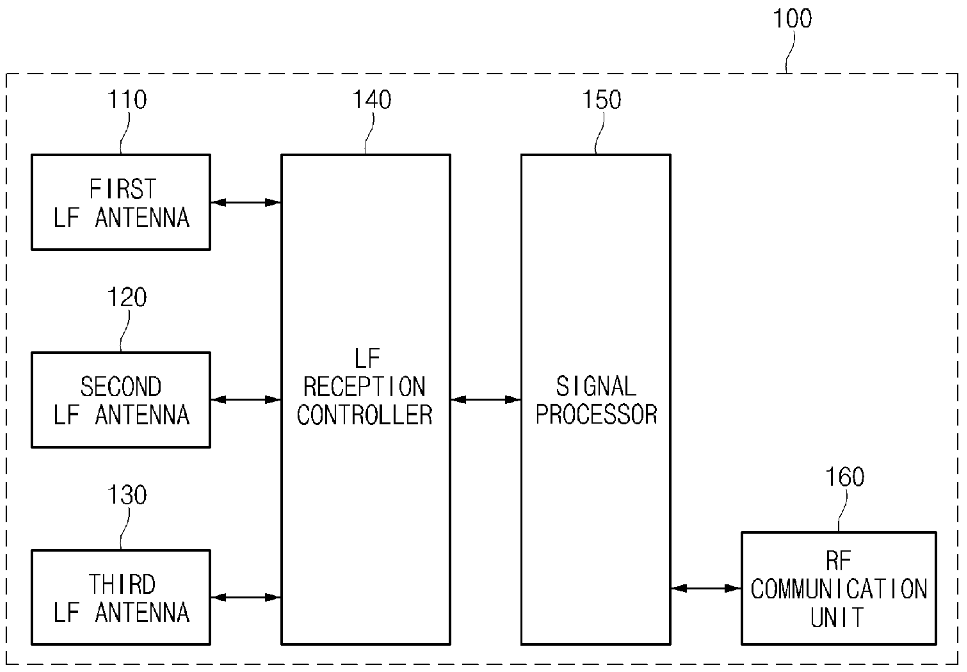
FIG. 2 is an exemplary block diagram illustrating a configuration of a smart key apparatus according to an exemplary embodiment of the present invention.

Accordingly, a configuration of the smart key apparatus 100 is described in more detail with reference to FIG. 2. FIG. 2 is an exemplary block diagram illustrating a configuration of a smart key apparatus according to an exemplary embodiment of the present invention. As illustrated in FIG. 2, the smart key apparatus 100 may include a first LF antenna 110, a second LF antenna 120, a third LF antenna 130, a LF reception controller 140, a signal processor 150, and a RF communication unit 160.

The first LF antenna 110 may be an LF antenna that has an x-axis as the reception axis, the second LF antenna 120 may be an LF antenna that has a y-axis as the reception axis, and the third LF antenna 130 may be an antenna that has a z-axis as the reception axis. The first LF antenna 110, the second LF antenna 120, and the third LF antenna 130 may be configured to receive the LF signal of the vehicle from the x-axis, y-axis, and z-axis respectively, and deliver the received LF signal to the LF reception controller 140. In addition, a reception level of the first LF antenna 110, the second LF antenna 120, and the third LF antenna 130 may be adjusted by the LF reception controller 140.

Moreover, each LF antenna may have order information. For example, each LF antenna may have order information that corresponds to the first order to the first LF antenna 110, the second order to the second LF antenna 120, and the third order to the third LF antenna 130. In particular, the LF reception controller 140 may be configured to verify the reception level sequentially according to the order information of each LF antenna when the wake-up signal for operating the smart key is received from the vehicle via the first LF antenna 110, the second LF antenna 120, and the third LF antenna 130.

The LF reception controller 140 may be configured to determine the LF antenna of the first order which has a reception level greater than a reference value among the first LF antenna 110, the second LF antenna 120, and the third LF antenna 130 as the reception antenna. As an example, the LF reception controller 140 may be configured to verify the reception level of the first LF antenna 110 which has the earliest order information. When the reception level of the first LF reception antenna is the reference value or greater, the LF reception controller 140 may be configured to determine the first LF antenna 110 as the reception antenna without verifying the reception level for the LF antenna of the following order. On the other hand, when the reception level of the first LF antenna is less than the reference value, the LF reception controller 140 may be configured to verify the reception level of the second LF antenna 120 that corresponds to the next order. In particular, the LF reception controller 140 may be configured to determine the second LF antenna 120 as the reception antenna without verifying the reception level for the LF antenna of the following order when the reception level of the second LF reception antenna is the reference value or greater. Additionally, when the reception level of the second LF reception antenna is less than the reference value, the LF reception controller 140 may be configured to verify the reception level of the third LF antenna 130 that corresponds to the next order. In particular, the LF reception controller 140 may be configured to determine the third LF antenna 130 as the reception antenna when the reception level of the third LF reception antenna is the reference value or greater. When the reception level of the third LF reception antenna is less than the reference value, since the reception level of all LF antennas that correspond to the LF signal transmitted from the vehicle is less than the reference value, the LF reception controller 140 may be configured to determine that the vehicle does not exist (e.g., is not located) within the communication area of the corresponding smart key.

Moreover, when the communication error occurs while receiving the signal via the LF antenna which is determined as the reception antenna among the first LF antenna 110, the second LF antenna 120, and the third LF antenna 130, the LF reception controller 140 may be configured to verify and compare the reception level that corresponds to the first LF antenna 110, the second LF antenna 120, and the third LF antenna respectively. In particular, the LF reception controller 140 may be configured to determine the LF antenna which has the highest reception level among the first LF antenna 110, the second LF antenna 120, and the third LF antenna 130 as the reception antenna.

As an example, under the assumption that the reference value of the reception level of each LF antenna is level 5, when the reception level of the first LF antenna 110 is level 5, the reception level of the second LF antenna 120 is level 3, and the reception level of the third LF antenna 130 is level 7 with respect to the wake-up signal received from the vehicle, then, the LF reception controller 140 may be configured to determine the third LF antenna 130 which has level 7 that is the highest reception level as the reception antenna. In other words, when the communication error between the vehicle and the smart key occurs, the LF reception antenna may be configured to determine the third LF antenna 130 which has the highest reception level as the reception antenna on behalf of the first LF antenna 110 which has the earliest order and has the reception level of the reference value or greater to increase a signal sensitivity for the signal which is transmitted from the vehicle.

Further, the LF reception antenna may be configured to determine the LF antenna having the highest reception level as the reception antenna, and change the reception level of the other LF antennas except for the reception antenna as the lowest level. As an example, the LF reception controller 140 may be configured to operate the reception level of the remaining LF antennas as the lowest level by executing an electric current flowing in a coil-type element included in the remaining LF antennas except for the reception antenna. The signal processor 150, executed by the controller, may be configured to process an operation that corresponds to the signal received from the reception antenna which is determined by the LF reception controller 140, and transmit a corresponding response signal to the vehicle via the RF communication unit 160.

Figure 3:
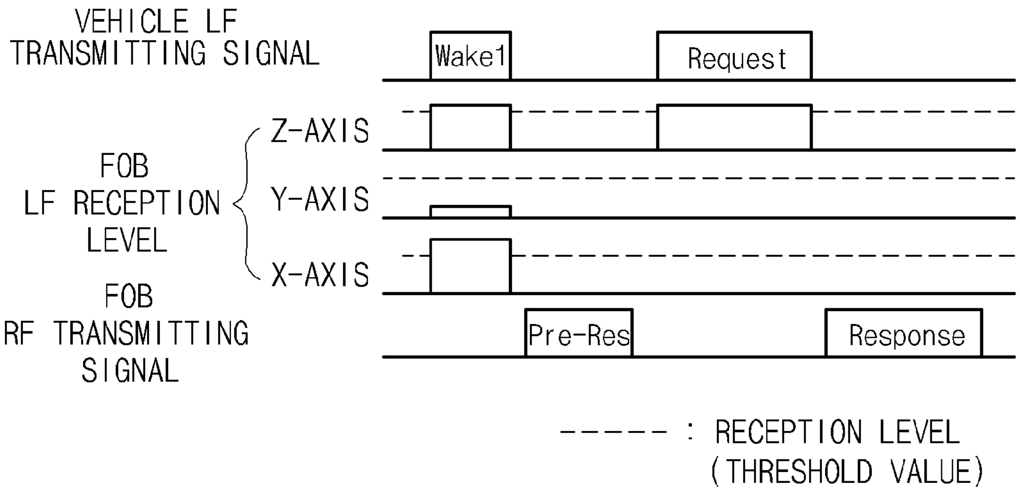
FIG. 3 is an exemplary diagram illustrating a reception signal processing operation of a smart key according to an exemplary embodiment of the present invention.

FIG. 3 is an exemplary diagram which explaining a reception signal processing operation of a smart key apparatus according to an exemplary embodiment of the present invention. In FIG. 3, it is assumed that the order information of the third LF antenna that corresponds to a z-axis is the first order, the second antenna that corresponds to y-axis is the second order, and the first antenna that corresponds to an x-axis is the third order.

As illustrated in FIG. 3, when a 'wake' signal is transmitted from the vehicle, the operation signal may be received from the vehicle via the first LF antenna, the second LF antenna, and the third LF antenna respectively. The smart key apparatus may be configured to verify whether the reception level of the third antenna that corresponds to the first order is the reference value or greater according to the order information of each LF antenna. In particular, since the signal reception level of the third LF antenna is the reference value or greater despite the reception level of other LF antennas, the smart key apparatus may be configured to determine the third LF antenna as the reception antenna, and transmit a 'pre-res' signal as a pre-response to thereof.

After that, when a 'request' signal is received from the vehicle, the smart key apparatus may be configured to process a required operation based on the 'request' signal which is received from the vehicle via the third LF antenna that is determined as the reception antenna, and transmit the 'response' signal to the vehicle as the response corresponding to the signal thereof.

Figure 4:
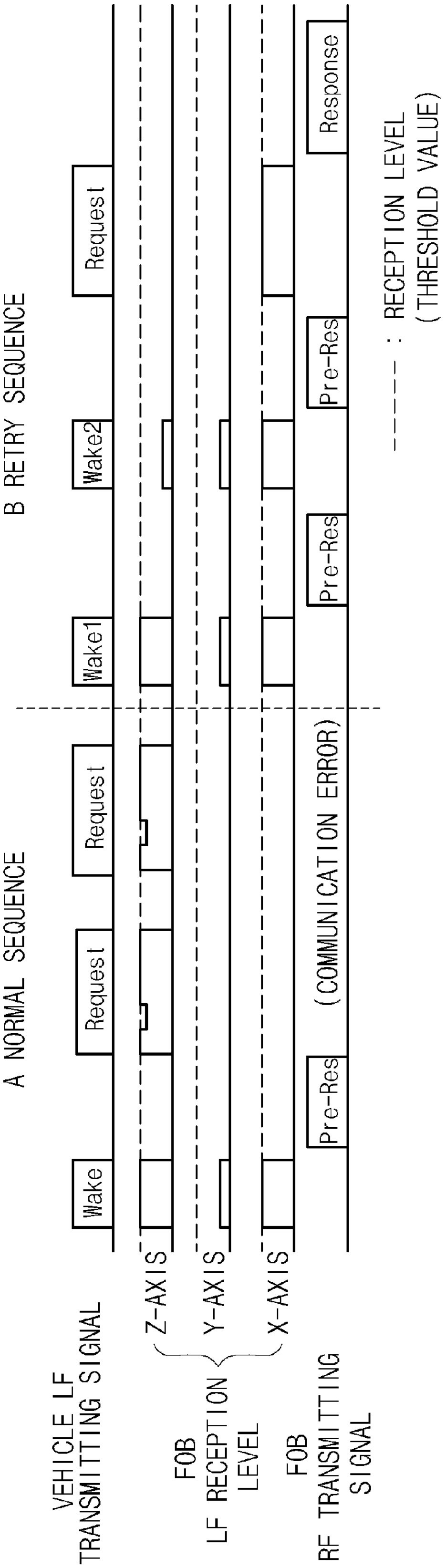
FIG. 4 is an exemplary diagram illustrating a reception signal processing operation during a communication error of a smart key apparatus according to an exemplary embodiment of the present invention.

FIG. 4 is an exemplary diagram which explaining a reception signal processing operation during a communication error of a smart key apparatus according to an exemplary embodiment the present invention. Likewise, in FIG. 4, it is assumed that the order information of the third LF antenna that corresponds to a z-axis is the first order, the second antenna that corresponds to a y-axis is the second order, and the first antenna that corresponds to an x-axis is the third order.

As illustrated in FIG. 4, when the communication error occurs during the communication between the smart key apparatus and the vehicle in the same manner as FIG. 3, a 'wake1' signal may be received from the vehicle via the first LF antenna, the second LF antenna, and the third LF antenna respectively when the 'wake1' signal is transmitted from the vehicle.

Furthermore, the smart key apparatus, executed by the controller, may be configured to verify and compare the reception level that corresponds to the first LF antenna, the second LF antenna, and the third LF antenna respectively. The smart key apparatus may be configured to determine the first LF antenna which has a highest reception level for the 'wake1' among the first LF antenna, the second LF antenna, and the third LF antenna as the reception antenna, and transmit the 'pre-res' signal as the pre-response that corresponds to the signal thereof. In particular, the smart key apparatus may be configured to change the reception level of remaining LF antennas except for the reception antenna, that is, the second LF antenna and the third LF antenna as the lowest level. Additionally, when a 'wake2' signal is transmitted from the vehicle, the smart key apparatus may be configured to receive the 'wake2' signal from the vehicle via the first LF antenna determined as the reception antenna, and transmit the 'pre-res' signal as the pre-response that corresponds to the signal thereof to the vehicle.

Hereafter, when a 'request' signal is received from the vehicle, the smart key apparatus may be configured to process a required operation based on the 'request' signal received via the first LF antenna which is determined as the reception antenna, and transmit the 'response' signal as the response that corresponds to the signal thereof to the vehicle.

Figure 5:
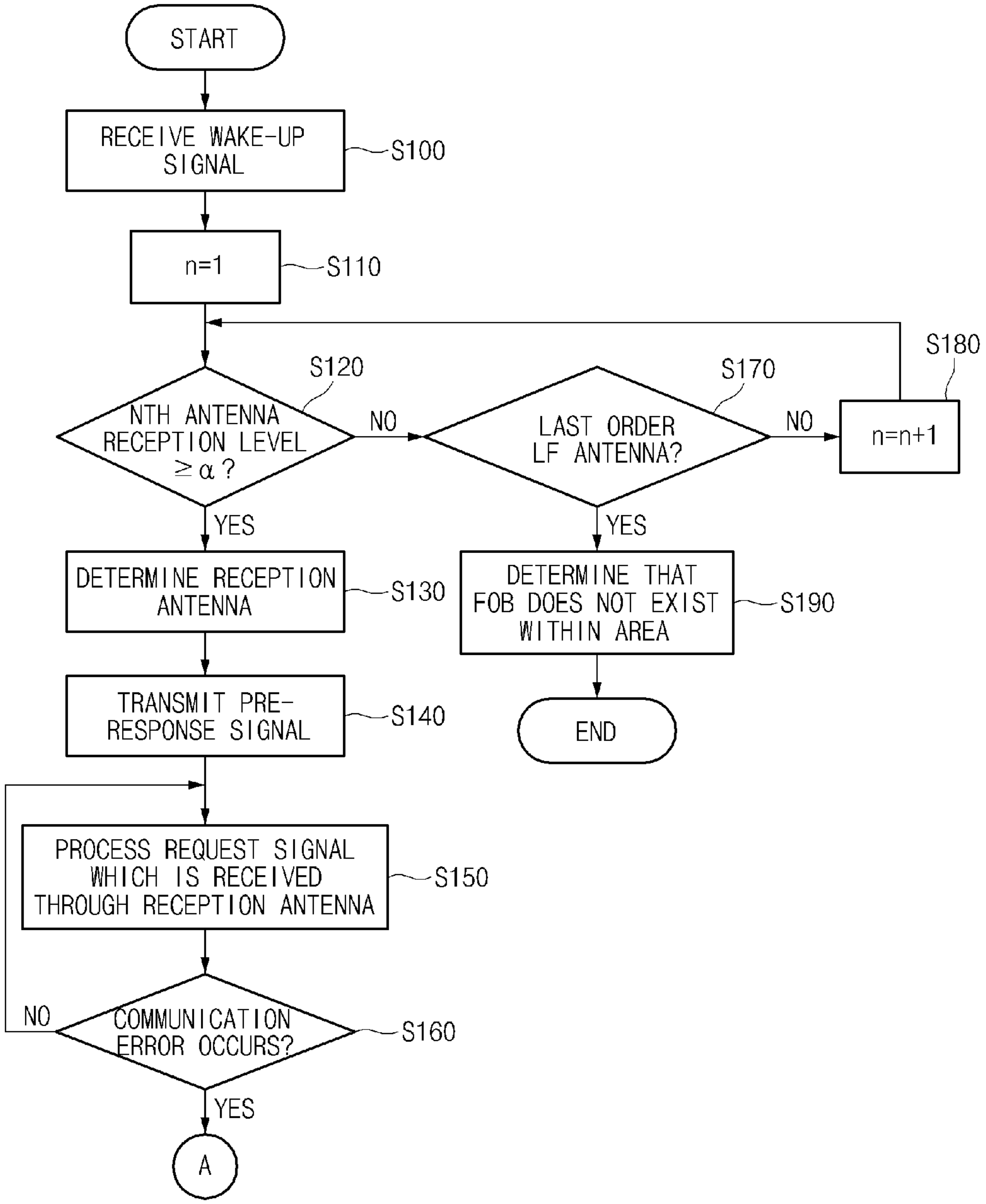
FIG. 5 is an exemplary flow chart illustrating an operation flow corresponding to a signal processing method of a smart key according to an exemplary embodiment of the present invention.

The signal processing operation flow of the smart key apparatus configured as described above according to an exemplary embodiment of the present invention is as follows. FIG. 5 is an exemplary flow chart illustrating an operation flow that corresponds to a signal processing method of a smart key apparatus according to an exemplary embodiment of the present invention. An exemplary embodiment of FIG. 5 is illustrated on the assumption that order information of each antenna is in order of a first antenna, a second antenna, and a third antenna.

As illustrated in FIG. 5, when a wake-up signal is received from the vehicle via the provided first antenna, the second antenna, and the third antenna (S100), the smart key apparatus, executed by a controller, may be configured to compare the reception level of the first antenna with the reference value by setting the first antenna which has the earliest order as an initial value (S110, S120). When the reception level of the first antenna is the reference value or greater, the smart key apparatus may be configured to determine the first antenna as the reception antenna (S130), and transmit the pre-response signal to the vehicle (S140). Next, the smart key apparatus may be configured to process the request signal which is received via the reception antenna that is determined in step 'S140' (S150).

Moreover, when the reception level of the first antenna is less than the reference value in step 'S120', the smart key apparatus may be configured to verify the reception level of antenna that corresponds to the next order after step 'S170' and step 'S180'. In other words, by comparing the reception level of the second antenna with the reference value, the smart key apparatus may be configured to verify whether the reception level of the second antenna is the reference value or greater, and verify whether the reception level of the third antenna that corresponds to the next order is the reference value or greater when the reception level of the second antenna is less than the reference value. When the reception level of the first antenna is less than the reference value, and the reception level of the second antenna is the reference value or greater, the second antenna may be determined to be the reception antenna. In addition, when the reception levels of the first antenna and the second antenna are less than the reference value, and the reception level of the third antenna is the reference value or greater, the third antenna may be determined as the reception antenna.

Furthermore, when the reception level of the third antenna is less than the reference value, the smart key (e.g., FOB) may be determined to not exist within the communication area as the third antenna is the LF antenna of the last order, such that the operation is terminated (S190).

Figure 6:
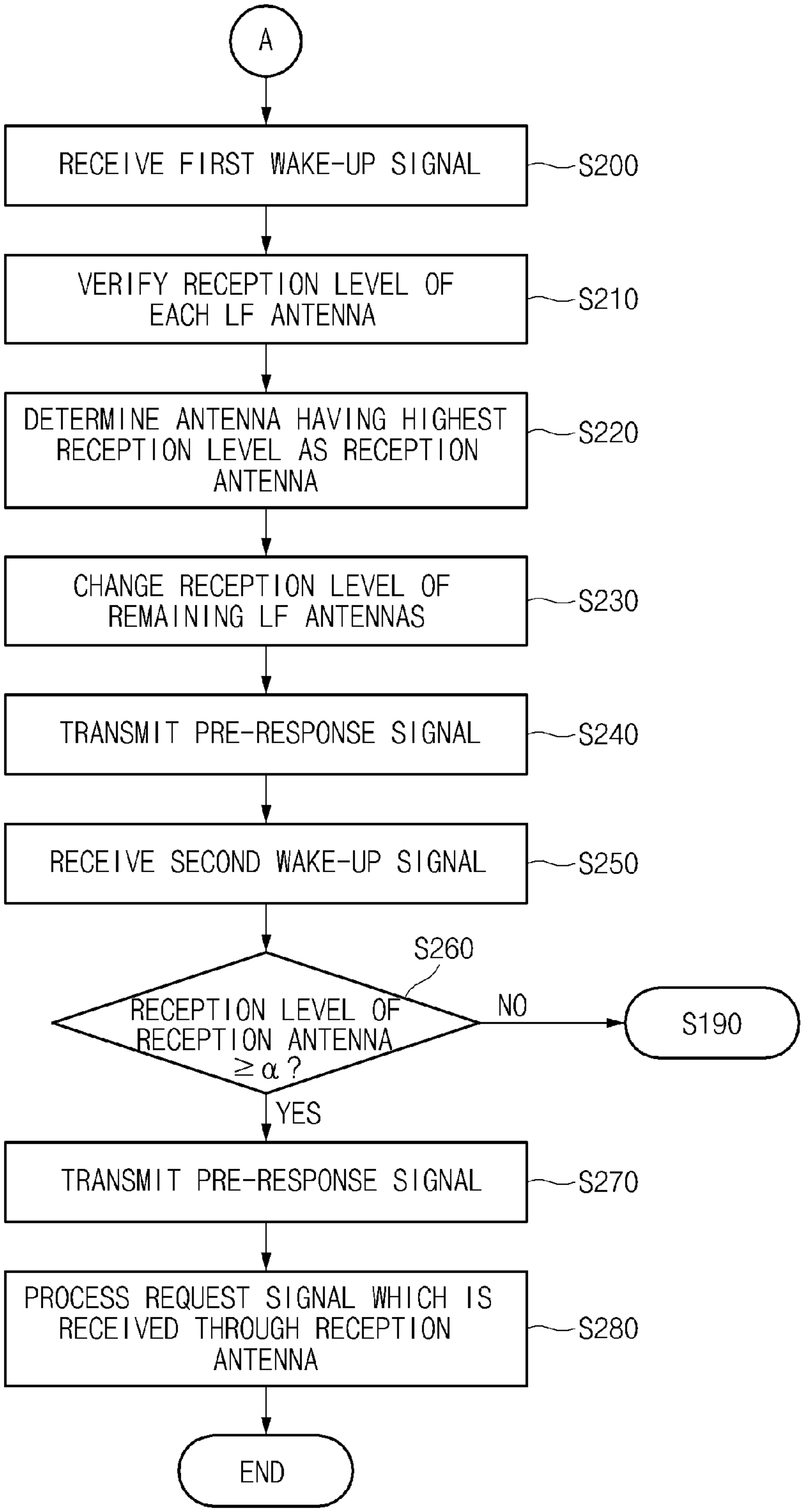
FIG. 6 is an exemplary flow chart illustrating an operation flow corresponding to a retry method of a smart key apparatus according to an exemplary embodiment of the present invention.

When the communication error between the smart key apparatus and the vehicle occurs while performing step 'S150' (S160), the smart key apparatus may be configured to enter a retry sequence to perform the steps after 'A' of FIG. 6. As shown in FIG. 6, when the first wake-up signal is received from the vehicle (S200), the smart key apparatus may be configured to verify the reception level of each LF antenna (S210), determine the antenna that has the minimum reception level as the reception antenna (S220), and change the reception level of the remaining LF antennas except for the reception antenna into the lowest level (S230).

Furthermore, the smart key apparatus may be configured to transmit the pre-response signal that corresponds to the reception antenna which is determined in step 'S220' to the vehicle (S240), and compare the signal reception level of the reception antenna with the reference value when the second wake-up signal is received from the vehicle via the reception antenna (S250). When the reception level of the reception antenna is less than the reference value (S260), the step 'S190' of FIG. 5 is performed. When the reception level of the reception antenna is the reference value or greater (S260), a corresponding pre-response signal may be transmitted to the vehicle (S270), and then, the request signal received via the reception antenna may be processed (S280).

According to an exemplary embodiment of the present invention, when a communication error occurs during a communication between a vehicle and a smart key, the communication error may be processed quickly by receiving the signal via the antenna which has the highest reception level among the antennas of each axis disposed within the smart key. In addition, a reception efficiency of the reception antenna may be increased by changing the reception level of the remaining antennas except for the antenna which has the highest reception level among the antennas of each axis disposed within the smart key as the lowest level. Further, the cost may be decreased since it may be possible to implement a function of processing a communication error of a smart key by changing a logic.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the accompanying claims.

What is claimed is:

1. A method for processing a signal of a smart key apparatus, the method comprising:

determining, by a controller, a first reception antenna by sequentially verifying a reception level according to a set order of a plurality of antennas when receiving a Low Frequency (LF) signal from the plurality of antennas which receive the LF signal from a vehicle via a plurality of reception axes;

processing, by the controller, the LF signal which is received via the first reception antenna;

comparing, by the controller, a reception level that corresponds to each of the plurality of antennas when a communication error with the vehicle occurs;

determining, by the controller, an antenna having a highest reception level among the plurality of antennas as a second reception antenna based on the comparison and changing, by the controller, the reception level of remaining antennas into a lowest level; and processing, by the controller, the LF signal which is received via the second reception antenna.

2. The method of claim 1, wherein determining a first reception antenna includes:

verifying, by the controller, the reception level of the plurality of antennas; and determining, by the controller, an antenna of a first order which has the reception level that is a reference value or greater as the first reception antenna.

3. The method of claim 1, wherein, before processing the LF signal which is received via the second reception antenna, further includes;

changing, by the controller, the reception level of the remaining antennas.

4. The method of claim 1, further comprising:

determining, by the controller, that the vehicle does not exist within a communication area when the reception level of the second reception antenna is less than a reference value.

5. A non-transitory computer readable medium containing program instructions executed by a controller, the computer readable medium comprising:

program instructions that determine a first reception antenna by sequentially verifying a reception level according to a set order of a plurality of antennas when receiving a Low Frequency (LF) signal from the plurality of antennas which receive the LF signal from a vehicle via a plurality of reception axes;

program instructions that process the LF signal which is received via the first reception antenna;

program instructions that compare a reception level that corresponds to each of the plurality of antennas when a communication error with the vehicle occurs;

program instructions that determine an antenna having a highest reception level among the plurality of antennas as a second reception antenna based on the comparison and change the reception level of the remaining antennas into a lowest level; and program instructions that process the LF signal which is received via the second reception antenna.

6. The non-transitory computer readable medium of claim 5, further comprising:

program instructions that verify the reception level of the plurality of antennas; and program instructions that determine an antenna of a first order which has the reception level that is a reference value or greater as the first reception antenna.

7. The non-transitory computer readable medium of claim 5, further comprising:

program instructions that change the reception level of the remaining antennas before processing the LF signal which is received via the second reception antenna.

8. The non-transitory computer readable medium of claim 6, further comprising: program instructions that determine that the vehicle does not exist within a communication area when the reception level of the second reception antenna is less than a reference value.

* * * * *